Dec. 4, 1928.
C. A. PARSONS ET AL
1,693,765
ELASTIC DRIVE
Filed March 24, 1927
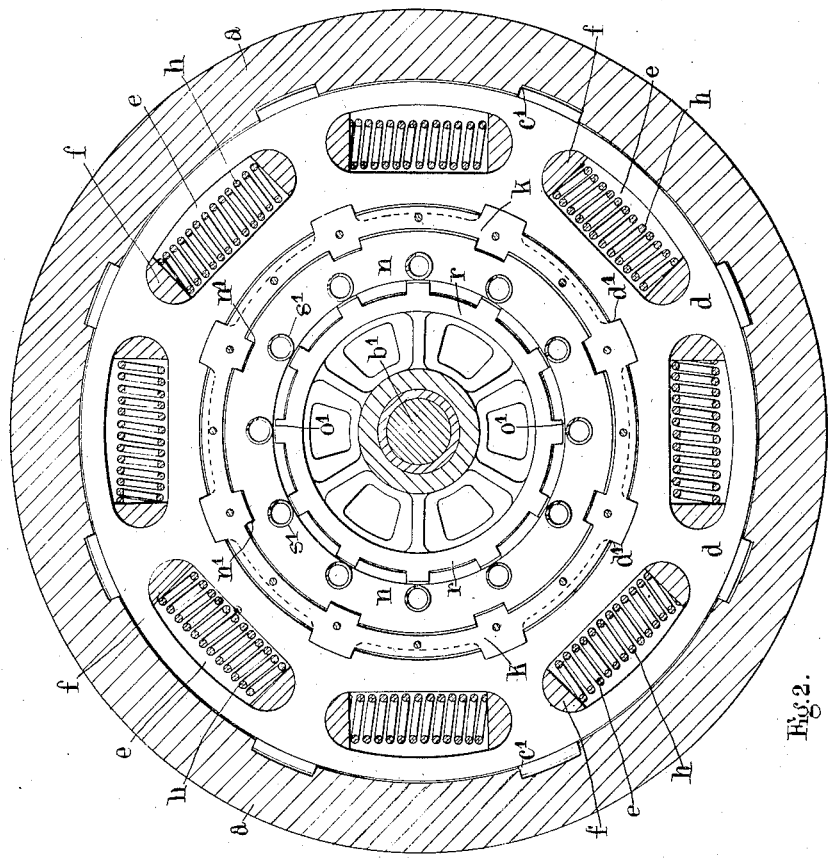
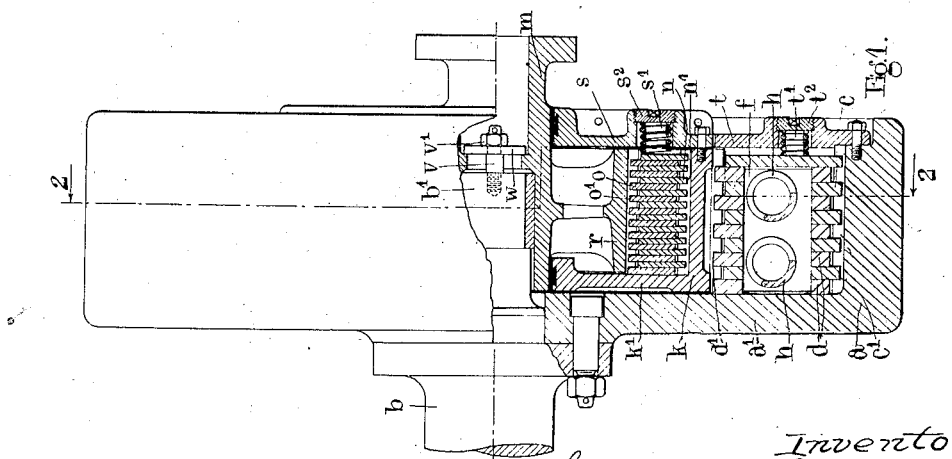
Inventor
Charles A. Parsons
Stanley S. Cook
by Spear, Middleton, Donaldson & Hall
Attys.

Patented Dec. 4, 1928.

1,693,765

UNITED STATES PATENT OFFICE.

CHARLES ALGERNON PARSONS AND STANLEY SMITH COOK, OF NEWCASTLE-UPON-TYNE, ENGLAND; SAID COOK ASSIGNOR TO SAID PARSONS.

ELASTIC DRIVE.

Application filed March 24, 1927, Serial No. 177,967, and in Great Britain May 6, 1926.

This invention relates to elastic drives acting in conjunction with devices for damping torsional oscillations.

When the torque to be transmitted varies considerably, as for example when starting or reversing with an internal-combustion or other variable-torque engine as the source of power, such excessive torque might be developed that it would be inconvenient or impracticable to provide for the whole of this torque to be transmitted by elasticity and damping in the elastic drives above mentioned.

The main object of the present invention is to overcome such difficulties and consists in the improved device hereinafter described and more particularly pointed out in the claims.

Referring to the accompanying drawings, which show one constructional form of the invention by way of example:—

Figure 1 is an elevation partly in section, while

Figure 2 is a cross-section on the line 2—2 of Figure 1.

In carrying the invention into effect according to one specific form, a circular box, $a$, open on one side is co-axially secured to the driving shaft, $b$, and in the outer portion of this box, i. e., that portion more remote from the centre, a series of damping plates, $c$, $d$, are arranged side by side, recesses, $e$, $e$, being formed in the plates, $c$, $d$, to receive the pads, $f$, $f$, and springs, $h$, $h$, for giving the drive the necessary elasticity.

The plates, $c$, $d$, are arranged alternately, those marked $c$ being splined to or operatively associated in an equivalent manner as at $c'$ with the inner circumference of the box, $a$, and those marked $d$ splined as at $d'$ to the outer circumference of a second or inner box, $k$, (similar generally to the main box or housing, $a$, within which it is disposed) freely rotatable on the driven shaft, $m$, or like member and rotatable in addition relatively to the driving shaft. This second box, $k$, the bottom of which, $k'$, is adjacent to the bottom, $a'$, of the main box, carries within it a second set of plates, $n$, $o$, (which may be thinner and greater in number than those of the elastic damping plates, $c$, $d$,) arranged alternately side by side, the plates marked $n$ being splined as at $n'$ to the inner circumference of the second box, $k$, and those marked $o$ splined as at $o'$ to the driven shaft or to a drum member, $r$, or the like formed thereon or securely attached thereto, the drum member conveniently projecting within the inner box to prevent axial movement of the latter; the inner box, $k$, thus forms a member common to both couplings through which power is transmitted in series from the driving to the driven shaft.

Annular covers, $s$, $t$, are provided respectively for the inner and outer boxes, $a$, $k$, to which they are detachably secured by any suitable means, while each cover is provided with sets of springs, $s'$, $t'$, and screw or other adjusters, $s^2$, $t^2$, by which the force pressing the plates of each set together can be regulated. The annular cover, $s$, of the inner box, $k$, is preferably mounted to rotate freely on the driven shaft while the annular cover of the outer box, if desired, may overlap the inner box to a certain extent as shown in Figure 1, so as to secure or assist in securing the latter in place.

The driving shaft, $b$, is or may be provided with a co-axial extension, $b'$, to serve on the one hand to centralize the main box and to provide a bearing for the hollow driven shaft, $m$, and on the other hand to receive a co-axial stud, $v$, or the like, the nut, $v'$, of which presses a circular disc or plate, $w$, against an internal shoulder on the driven shaft and so holds the driving and driven shafts in proper axial relation, for example during assembly or dismantling, without interfering with their freedom of relative angular movement.

In the form of the invention particularly described, it will be seen that the slipping coupling is compactly housed within the elastic coupling but any other convenient construction may be adopted.

In order to secure the results desired, the slipping coupling is designed to be operatively responsive to torques in excess of those safely transmissible by the elastic damping coupling; for example, if the elastic coupling is capable of transmitting one-quarter the normal torque by the damping friction alone and two-and-a-half times the normal torque by the damping friction and the action of the springs jointly, the slipping coupling may be designed to slip when transmitting say twice the normal torque, which is the maximum permissible.

It will be obvious that the driving and driven members may be interchanged and that other variations in the details of construction may be made.

We claim:

1. In combination, a driving member and a driven member; an intermediate element therebetween; an elastic drive and damping means therefor in parallel between one of said members and said intermediate element, said drive being designed to transmit a certain working torque; and in series with said elastic drive and said damping means and in power-transmitting relation between said intermediate element and the other of said members a friction coupling capable of slipping an unlimited amount in response to the torques greater than said certain working torque.

2. The combination claimed in claim 1, in which said damping means and said friction coupling each comprise two sets of friction elements, the one set surrounding the other set.

3. The combination claimed in claim 1, in which said intermediate element is rotatably mounted one of said members.

4. The combination claimed in claim 1, in which said damping means and said friction coupling each comprise two sets of friction elements, the one set surrounding the other set; a member intermediate said driving and driven members, in operative driving relation to which intermediate member are disposed certain elements of said damping means and said friction coupling, said intermediate member serving as a housing for one of said sets of friction elements; a common housing containing both said damping means and said friction coupling; means for applying pressure laterally to said two sets of friction elements and detachable closing means on said intermediate member and on said common housing, said detachable closing means serving as abutments for said pressure-applying means.

5. The combination claimed in claim 1, in which said damping means and said friction coupling each comprise two sets of friction elements, the two sets of said damping means being capable of only a limited relative movement and the two sets of said friction coupling of an unlimited relative movement.

In testimony whereof we have signed our names to this specification.

CHARLES ALGERNON PARSONS.
STANLEY SMITH COOK.